US009717262B2

(12) United States Patent
Mcleod et al.

(10) Patent No.: US 9,717,262 B2
(45) Date of Patent: Aug. 1, 2017

(54) CONFECTIONERY PROCESSING MACHINE AND MANUFACTURING PROCESS

(75) Inventors: Emma Mcleod, Northfield, IL (US); Bernard Rocklage, Northfield, IL (US)

(73) Assignee: CADBURY UK LIMITED, Birmingham West Midlands (GB)

( * ) Notice: Subject to any disclaimer, the term of this patent is extended or adjusted under 35 U.S.C. 154(b) by 422 days.

(21) Appl. No.: 14/006,906

(22) PCT Filed: Mar. 22, 2012

(86) PCT No.: PCT/GB2012/050637
§ 371 (c)(1),
(2), (4) Date: Jan. 24, 2014

(87) PCT Pub. No.: WO2012/127241
PCT Pub. Date: Sep. 27, 2012

(65) Prior Publication Data
US 2014/0127344 A1    May 8, 2014

(30) Foreign Application Priority Data
Mar. 22, 2011    (GB) .................................. 1104814.7

(51) Int. Cl.
*A23G 3/02*    (2006.01)
*A23G 1/20*    (2006.01)
(Continued)

(52) U.S. Cl.
CPC ........... *A23G 3/0257* (2013.01); *A23G 1/045* (2013.01); *A23G 1/206* (2013.01); *A23G 3/021* (2013.01);
(Continued)

(58) Field of Classification Search
CPC ...... A23G 3/0257; A23G 3/021; A23G 3/203; A23G 9/282; A23G 9/288; A23G 1/045;
(Continued)

(56) References Cited

U.S. PATENT DOCUMENTS

| 1,968,711 A | 7/1934 | Savy |
| 2,032,812 A | 3/1936 | Quattrin et al. |

(Continued)

FOREIGN PATENT DOCUMENTS

| CA | 904098 | 7/1972 |
| CN | 1111945 | 11/1995 |

(Continued)

OTHER PUBLICATIONS

The Intellectual Property Office of the People'S Republic of China; Notification of the Second Office Action; Application No. 201280022161.X; Date of Notification: Jul. 7, 2015.

(Continued)

*Primary Examiner* — Robert B Davis
(74) *Attorney, Agent, or Firm* — Cantor Colburn LLP (57) ABSTRACT

A confectionery processing machine has a hopper attached to a dispensing unit. The dispensing unit comprises a plurality of co-operating piston and nozzles. The hopper is arranged to supply an edible material to the plurality of co-operating piston and nozzles. The dispensing unit is arranged in order to dispense the edible material from the plurality of co-operating piston and nozzles. The confectionery processing machine is improved by providing the hopper with at least two separate compartments. Here, each compartment separately provides edible material to a portion of the plurality of pistons. Consequently, a more flexible confectionery processing machine is provided because all the plurality of piston and nozzles are not provided from the same compartment.

23 Claims, 5 Drawing Sheets

(51) Int. Cl.
*A23G 3/20* (2006.01)
*A23G 9/28* (2006.01)
*A23G 1/04* (2006.01)

(52) U.S. Cl.
CPC ............. *A23G 3/203* (2013.01); *A23G 9/282* (2013.01); *A23G 9/288* (2013.01)

(58) Field of Classification Search
CPC ........ A23G 1/206; A23G 1/0066; A23G 1/24; B05C 5/0237
See application file for complete search history.

(56) References Cited

U.S. PATENT DOCUMENTS

| | | | |
|---|---|---|---|
| 2,837,041 A | 6/1958 | Endeveld | |
| 3,450,070 A | 6/1969 | Fowler et al. | |
| 6,054,095 A | 4/2000 | Minato et al. | |
| 6,161,733 A | 12/2000 | King | |
| 7,632,529 B2 * | 12/2009 | Lang ................ | A23G 3/203 222/132 |
| 2003/0201559 A1 | 10/2003 | Bellasalma | |
| 2004/0130593 A1 * | 7/2004 | Decorte .............. | A23G 3/2092 347/40 |
| 2006/0051475 A1 | 3/2006 | Fornaguera et al. | |
| 2008/0274241 A1 | 11/2008 | Steuer et al. | |
| 2010/0291269 A1 | 11/2010 | Ouriev | |

FOREIGN PATENT DOCUMENTS

| | | | | |
|---|---|---|---|---|
| CN | 1623410 | | 6/2005 | |
| DE | 2142158 | A1 | 3/1973 | |
| DE | 2322918 | | 11/1974 | |
| DE | 2414819 | A1 | 10/1975 | |
| DE | 2913597 | A1 | 10/1980 | |
| DE | 4040429 | A1 | 7/1991 | |
| DE | 4423652 | A1 | 1/1996 | |
| DE | 10143392 | A1 | 3/2003 | |
| DE | 102009032625 | B3 | 1/2011 | |
| EP | 0630574 | A1 | 6/1994 | |
| EP | 0668021 | A1 | 8/1995 | |
| EP | 1161880 | | 12/2001 | |
| EP | 1757192 | A1 | 2/2007 | |
| GB | 371179 | A | 4/1932 | |
| GB | 371279 | | 4/1932 | |
| GB | 386985 | A | 1/1933 | |
| GB | 449226 | A * | 6/1936 | ............ A21C 5/006 |
| GB | 491361 | A | 8/1938 | |
| GB | 1185378 | A | 3/1970 | |
| GB | 1283073 | A | 7/1972 | |
| GB | 1386469 | | 3/1975 | |
| GB | 1513538 | | 1/1977 | |
| GB | 1481177 | A | 7/1977 | |
| GB | 2131936 | | 6/1984 | |
| GB | 2273259 | A | 6/1994 | |
| JP | 54038357 | | 3/1979 | |
| JP | 59091013 | | 5/1984 | |
| WO | 0211542 | | 2/2002 | |
| WO | 2008141468 | A1 | 11/2008 | |

OTHER PUBLICATIONS

CN OA Nov. 11, 2014, CN Application No. 201280022161, with English Translation.
AU Examination Report, Application No. 2012232871 dated May 6, 2014.
GB Search Report, Application No. GB1104814.7 dated Jul. 15, 2011.
GB Search Report, Application No. GB1104814.7 dated Nov. 21, 2011.
ISR_PCTGB2012050637_dated Sep. 20, 2013.
EP OA Application No. 12713271.0, dated Dec. 3, 2014.
Minifie, Bernard W., "Chocolate, Cocoa, and Confectionary," Science and Technology, Third edition, van Nostrand Reinhold, New York, 1989, ISBN 0-4422-26521-2, p. 213 and figure 7.21 on p. 215.

* cited by examiner

Figure 1

[PRIOR ART]

CONFECTIONERY PROCESSING MACHINE AND MANUFACTURING PROCESS

FIELD

The disclosure relates to a confectionery processing machine for dispensing an edible material, such as chocolate, in a confectionery manufacturing process.

BACKGROUND

Figure 1:
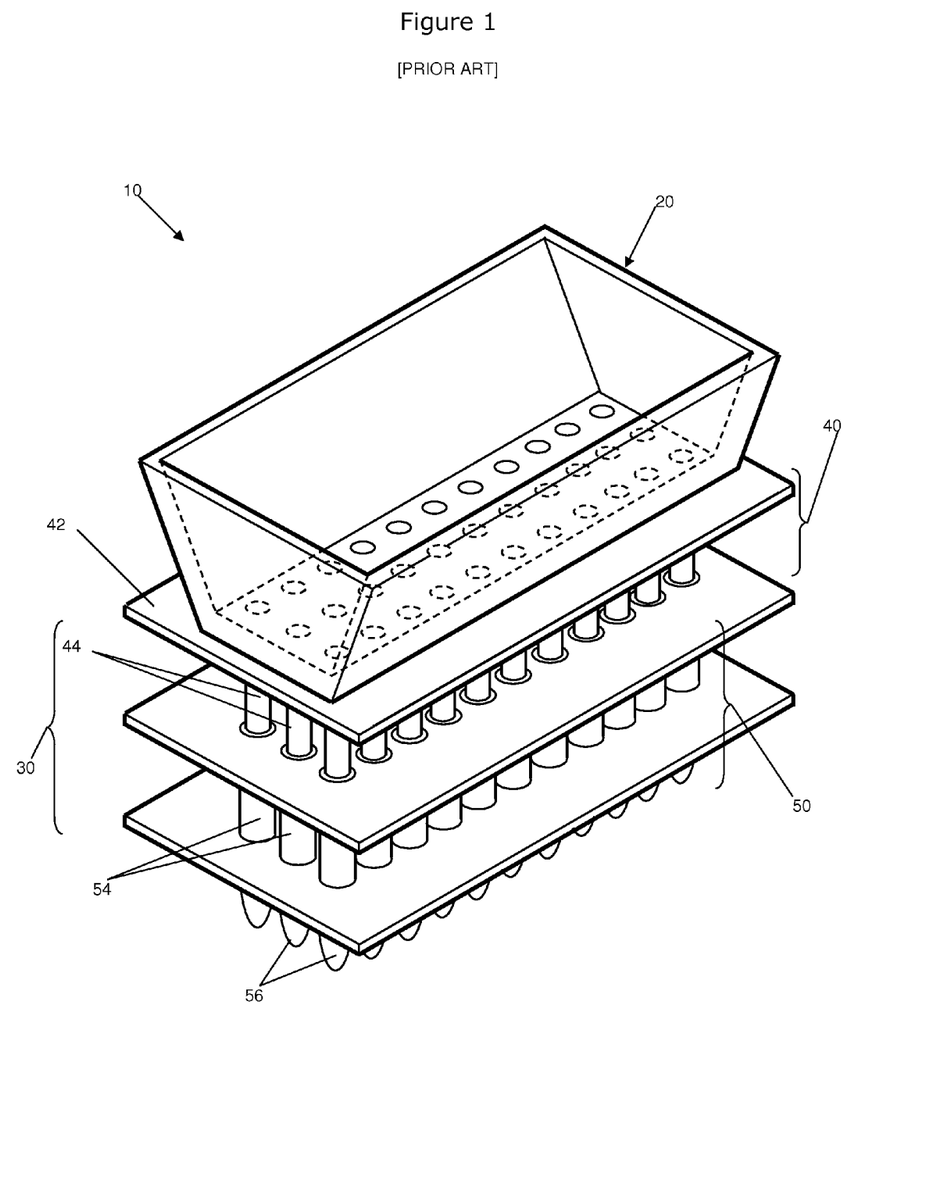
FIG. 1 shows a perspective view of an example of a prior art confectionery processing machine.

Confectionery processing machines for dispensing an edible material are known. For instance, referring to FIG. 1, a known confectionery processing machine 10 is shown. The machine 10 is a multi-nozzle depositor and includes a hopper 20 for containing the chocolate to be dispensed. The hopper 10 is attached to a dispensing unit 30 in order to dispense the chocolate. The dispensing unit 30 comprises a piston unit 40 and a nozzle unit 50. The piston unit 40 typically has a piston plate 42. The hopper 20 is arranged on one side of the piston plate 42. A plurality of pistons 44 extend from the other side of the piston plate 42. Each piston 44 is in fluid communication with the hopper 20. The nozzle unit 50 comprises a plurality of nozzles 54 within which the pistons 44 are sealed. The piston unit 40 is arranged to be movable in a reciprocating manner relative to the nozzle unit 50. In use, as the piston unit 40 moves away from the nozzle unit 50 during an upstroke, chocolate contained in the hopper is drawn into the nozzles 54 through the pistons 44. In a following down stroke, in which the piston unit 40 moves towards the nozzle unit 50, the chocolate that had previously been drawn into the nozzles 54 is ejected through nozzle tips 56. The mass which is discharged from the nozzle tips 56 is then pressed or cast onto a surface or into a mould according to the manufacturing process in order to form moulded or cast confectionery.

Various modifications to the dispensing unit have been considered. For example, WO2008/141468 discusses in more detail the precise operation of a suitable dispensing unit.

It would be beneficial if a confectionery processing machine was provided that was capable of matching plant output to demand and that would enable the confectionery processing machine to be more adaptable in order to accommodate processing methods for new confection.

SUMMARY

The disclosure seeks to overcome at least one of the above or other disadvantages. It is a further aim to provide a confectionery processing machine that provides greater adaptability and/or flexibility to the processing plant.

According to the disclosure there is provided a confectionery processing apparatus and a method of adapting a confectionery processing apparatus as set forth in the appended claims. Other features of the disclosure will be apparent front the dependent claims, and the description which follows.

According to a first aspect of the disclosure, there is provided a confectionery processing machine. In the exemplary embodiments, the confectionery processing has a hopper attached to a dispensing unit. The dispensing unit comprises a plurality of cooperating piston and nozzles. The hopper is arranged to supply an edible material to the plurality of co-operating piston and nozzles. The dispensing unit is arranged in order to dispense the edible material from the plurality of co-operating piston and nozzles. The confectionery processing machine is improved by providing the hopper with at least two separate compartments. Here, each compartment separately provides edible material to a portion of the plurality of pistons. Consequently, a more flexible confectionery processing machine is provided because all the plurality of piston and nozzles are not provided from the same compartment.

In one particular exemplary embodiment, the hopper is divided into first and second separate compartments by a dividing means. The dividing means may comprise at least one dividing plate. A first dividing plate may be fixed within the hopper. In this case, the hopper may be detachably mounted to the dispensing unit. Here, the confectionery processing machine comprises a plurality of hoppers, with each hopper arranged to provide an alternative configuration of the size of each compartment. Thus, the number of co-operating piston and nozzles supplied by each compartment can be selected by replacing one hopper with an alternative hopper. Additionally or alternatively to the confectionery processing machine having a fixed divider, the confectionery processing machine may be provided with at least one moveable divider. Here, the moveable divider separates a portion of the hopper in to first and second compartments. The moveable divider is movable within the hopper in order to selectively change the number of co-operating piston and nozzles that the first compartment is in communication with. Here, the moveable divider seals to the hopper in order to separate the portion of the hopper into the at least two compartments.

The provision of a dividing means therefore enables the confectionery processing machine to be easily adapted. For instance, the capacity of the confectionery processing machine can be adapted to match the output demand of the processing plant by reducing or increasing the number of compartments that are filled with edible material. Alternatively, the confectionery processing machine can be used for new processing methods by for instance, filling different compartments with different materials.

Consequently, in accordance with a second aspect of the disclosure there is provided a method of adapting a confectionery processing plant. Here, the method comprises filling a number of separate compartments for a first production cycle and subsequently filling a different number of compartments or filling compartments with a different edible material for a second production cycle.

According to a further aspect, there is provided a dispensing unit for a processing machine. The dispensing unit comprises a piston unit and a nozzle unit. The piston unit and nozzle unit are arranged to move relative to each other in order to dispense material from a hopper. The hopper may be substantially in accordance with the previous aspects or may be any known hopper. The piston unit comprises a plurality of pistons. The nozzle unit comprises a corresponding plurality of nozzles. The pistons and nozzles are arranged to co-operate in order to dispense the material. The dispensing unit is improved because at least one of the co-operating pistons and nozzles is configured to dispense a different volume to at least one other co-operating piston and nozzle.

In one exemplary embodiment, the co-opera ing piston and nozzle is configured by altering the volume of the nozzle. Additionally or alternatively, the volume may be configured by adjusting the stroke length. Preferably, the configured volume is adjustable.

According to a further exemplary embodiment, a processing machine is provided having zonal heating. Thus, different areas of a hopper and/or a dispensing unit may be heated independently. The hopper and/or dispensing unit may be substantially in accordance with previous aspects.

In a further exemplary embodiment, a processing plant and method is provided. The processing plant includes a processing machine and a vibration station and/or a cooling station. The vibration station and/or cooling station may be zonal. That is, the vibration station may be configured advantageously to provide different vibration characteristics to one dispensed material than to another. Furthermore, the cooling stations may be configured advantageously to provide different cooling characteristics to the different materials. Consequently, a vibration station and/or cooling station are also provided. The cooling station and vibration station may be used independently, in conjunction with each other and/or in conjunction with a dispensing machine in accordance with previous aspects.

BRIEF DESCRIPTION OF THE FIGURES

For a better understanding, and to show how embodiments of the same may be carried into effect, reference will now be made, by way of example, to the accompanying diagrammatic drawings in which.

DETAILED DESCRIPTION

Figure 2:
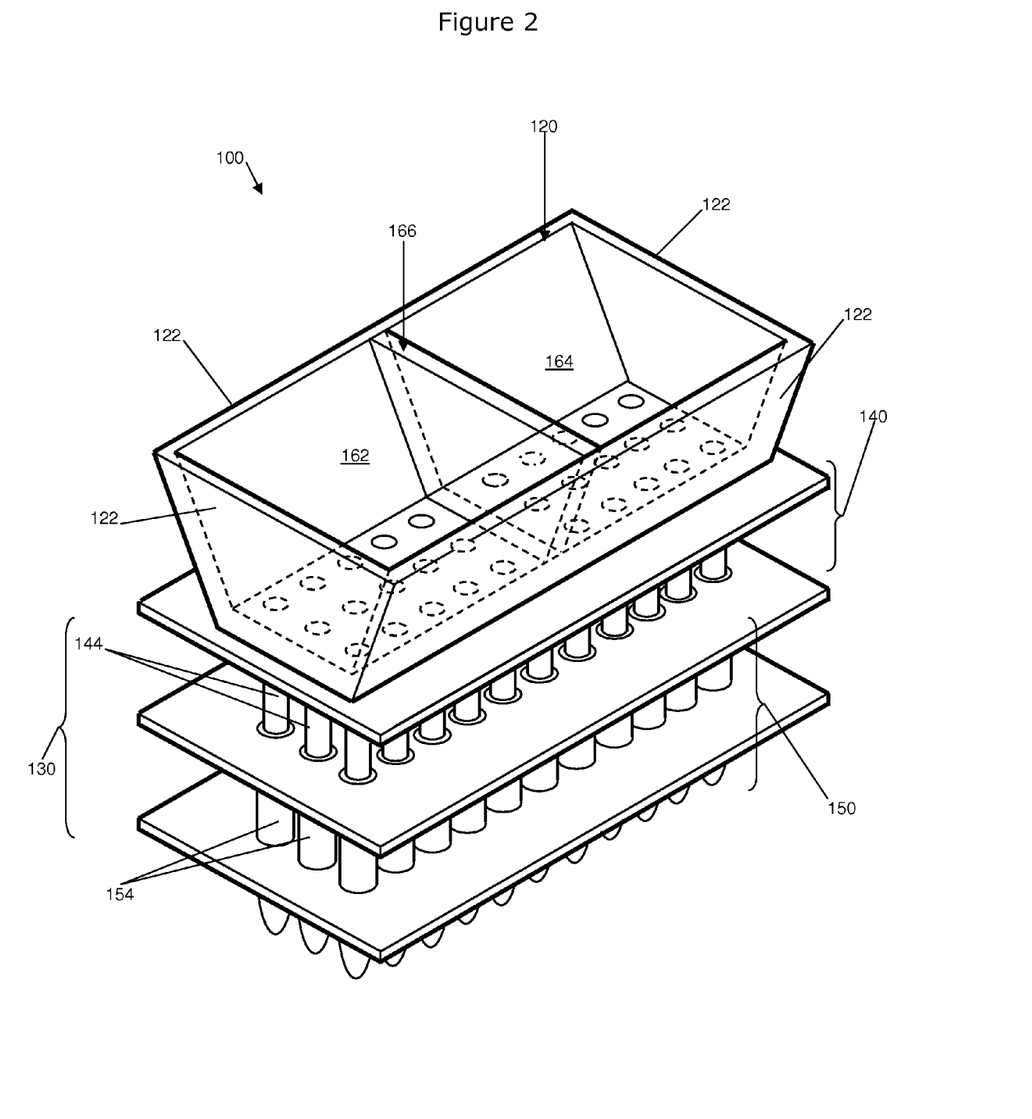
FIG. 2 shows a perspective view of a confectionery processing machine in accordance with an exemplary embodiment.

Referring to FIG. 2, a first embodiment of a confectionery processing machine 100 is shown. The confectionery processing machine 100 comprises a hopper 120 and a dispensing unit 130. The hopper provides edible material to the dispensing unit in order for the dispensing unit to dispense the edible material. Suitably, the edible material is confectionery such as chocolate. The dispensing unit is a multi-nozzle depositor. That is, the dispensing unit has a plurality of co-operating pistons and nozzles that are arranged to co-operate to dispense the edible material. Each co-operating piston and nozzle is supplied by material from the hopper 120. The plurality of co-operating pistons and nozzles are fixed with respect to each other and arranged in the dispensing unit 130 in accordance with a given manufacturing plant. However, typically the plurality of co-operating pistons and nozzles may be arranged in multiple rows. For example, the plurality of co-operating pistons and nozzles may be arranged in a grid like pattern.

Suitably, as shown in FIG. 2, the dispensing unit 130 comprises a piston unit 140 and a nozzle unit 150 that are arranged to be moveable toward and away from each other in a reciprocating up-stroke and down-stroke motion. The piston unit 140 has a plurality of pistons 144. Each piston 144 is hollow and able to be arranged, in use, in fluid communication with the hopper 120. Consequently, the edible material within the hopper is able to be drawn in to each piston on an upstroke. Each piston co-operates with a nozzle 154 in the nozzle unit 150. The dispensing unit 130 is arranged to dispense the edible material from each nozzle 154 during the down stroke.

Whilst the dispensing unit is described herein in relation to a piston and nozzle arrangement, exemplary embodiments may be based on other known depositors and particularly those using a piston arrangement such as a horizontal piston or rotary valve.

The hopper 120 forms a boundary that encloses all the plurality of co-operating pistons and nozzles 144, 154. Suitably, the hopper is formed from side walls joined continuously about the boundary. For instance, in the Figures, the hopper 120 is shown as being formed from four, joined side walls 122. The hopper may include a bottom plate, here the bottom plate includes apertures that are arranged to be in alignment with the plurality of co-operating pistons and nozzles and therefore provide the fluid communication between the nozzles and hopper 120. Alternatively, the hopper is not provided with a bottom plate and the sidewalls are sealed directly to the dispensing unit 130.

Advantageously, the hopper 120 includes a first dividing means. The dividing means separates the hopper 120 in to a first compartment 162 and a second compartment 164. Here, the first and second compartments are isolated from each other. That is, edible material filled into one compartment cannot flow into the other compartment. Each compartment 162, 164 is therefore in communication with only a portion of the plurality of co-operating pistons and nozzles. Consequently, the provision of a dividing means allows the confectionery processing machine 100 to be adapted to suit new processes and to fit the output demand of the plant. For instance, if the output demands a reduced output, one of the compartments can be left empty.

Suitably, the dividing means is a dividing plate 166. The dividing plate 166 provides a continuous barrier from one side of the hopper to the other and is sized accordingly. However, in alternative embodiments discussed below, the dividing plate 166 may also extend between the hopper and a second dividing plate or two further dividing plates. It will therefore be appreciated that in order to achieve the required separation, the dividing plate 166 seals to the hopper 120, That is, as shown in FIG. 2, ends of the dividing plate 166 seal to the side walls 122 of the hopper. A bottom of the dividing plate 166 seals to the bottom plate, when provided, or the dispensing unit 130 when not.

In the exemplary embodiment shown in FIG. 2, the dividing plate 166 is arranged to be fixed fast to the hopper 120. For instance, the dividing plate 166 may be integrally formed with the side walls 122 or welded or joined using adhesive or the like. In this embodiment, in order for the confectionery processing machine to be flexible, the hopper is attached to the dispensing unit 130 using a quick release mechanism. Thus, because the hopper is easily removed from the dispensing unit 130, the confectionery processing machine may include multiple hoppers 120, with each hopper adapted to provide a different combination of compartment sizes and therefore a different proportion of co-operating piston and nozzles in communication with each compartment. Consequently, the confectionery processing machine is able to be adapted by swapping hoppers.

Figure 3:
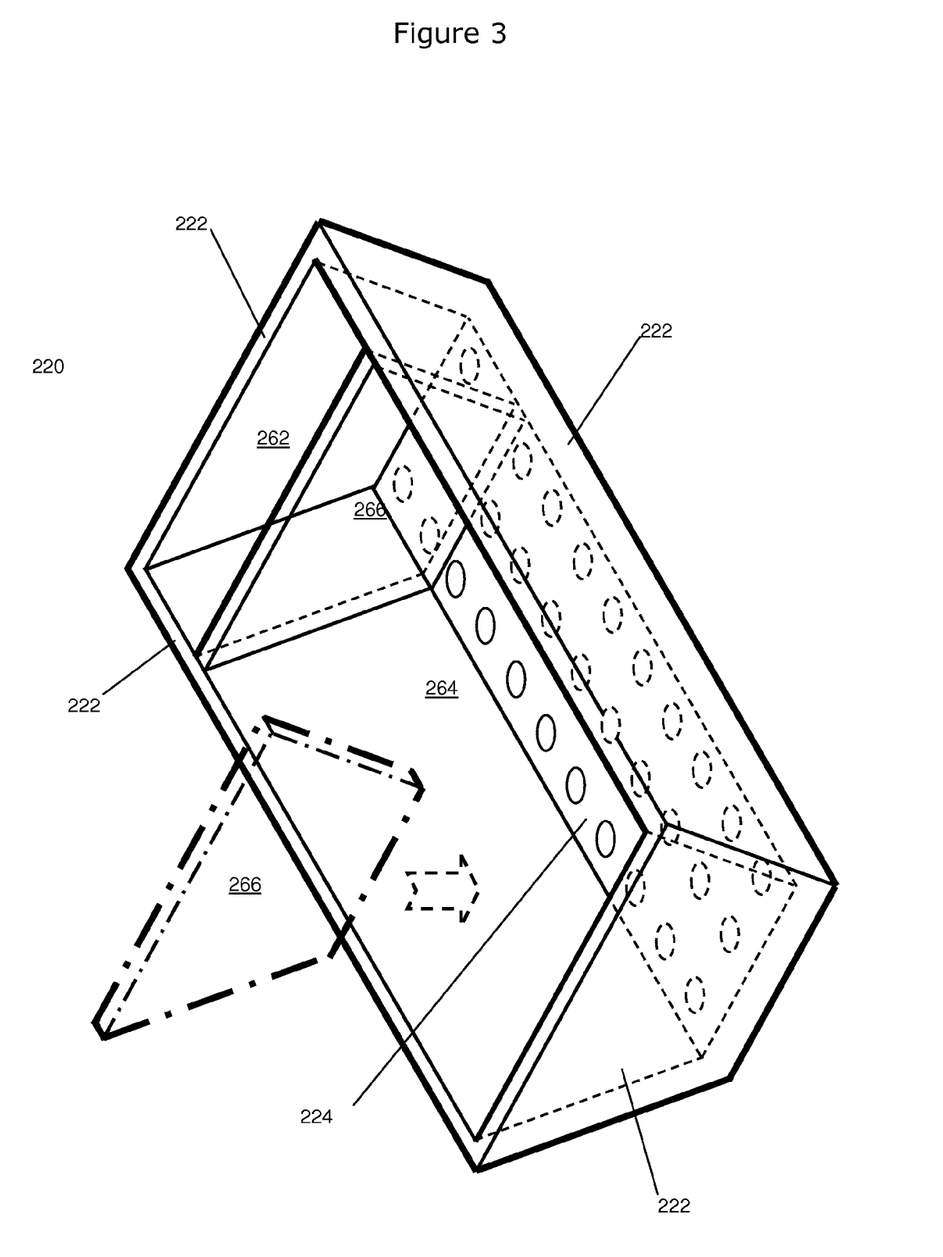
FIG. 3 shows a perspective view of a hopper for use with a confectionery processing machine in accordance with an exemplary embodiment.

Referring to FIG. 3, a hopper 220 in accordance with an alternative exemplary embodiment is shown. Here, the hopper 220 is substantially the same as the hopper 120 previously described. For instance, the hopper 220 provides a boundary for enclosing all the plurality of co-operating piston and nozzles and may have side walls 222, continuously, joined along the boundary. A bottom plate 224 may or may not be provided as previously discussed. Again, advantageously, a dividing means is provided to separate the hopper 220 in to a first compartment 262 and a second compartment 264.

In the alternative exemplary embodiment shown in FIG. 3, the dividing plate 166 is moveable within the hopper 220. Thus, although the hopper may also be attached to a dispensing unit a quick-release mechanism so that flexibility is provided by replacing hoppers, the hopper 220 is also able to be flexibly adapted by moving the dividing plate 166 within the hopper 220. Here, the relevant sides of the dividing plate 166 may be provided with seals in order to provide the required separation between the compartments. The seals may be stiff so that they exert a force to maintain the dividing plate 166 in position. Here, the dividing plate may be moveable by sliding the dividing plate within the hopper 220. However, additionally, or alternatively, one or more of the side walls 222 (and bottom plate 224, when present) may be provided with channels (not shown) for receiving the dividing plate 266. The channels may be slots formed in the walls 222 or may be channels provided by two parallel protrusions that extend from the side walls 222. Where channels are provided, channels may be provided between each row of apertures in the bottom plate 224, or between each row of co-operating piston and nozzles.

Consequently, there is provided a confectionery processing machine having an roved hopper 120, 220 that enables the confectionery processing machine to be adapted to suit demand and new processing methods. Therefore, although the improved hopper 120, 220 has been described in relation to a dispensing unit, the hopper 120, 220 may be used to improve other machines using a hopper.

Furthermore, herein the hopper 120, 220 has been described having a dividing means, comprising a first dividing plate. However, further configurations are envisaged wherein the dividing means comprises a plurality of dividing plates. Here the plurality of dividing plates may be fixed fast, moveable, or a combination thereof. Consequently, the hopper 120, 220 is divided in to three or more separate compartments. For instance, the plurality of dividing plates may be two dividing plates. Here, the two dividing plates may be arranged parallel to each other and arranged to separate the hopper at two spaced locations. However, as well as the dividing plates extending between two sides of the hopper, dividing plates may extend between a side of the hopper and a second dividing plate or even between two dividing plates.

The confectionery processing machine 100 has been described herein in relation to known dispensing units 130. Here, the dispensing unit is designed to dispense substantially identical volumes of material from each nozzle. However, one of the main advantages of the improved hopper described herein is that the processing machine is adaptable and allows different material to be dispensed from nozzles of the same machine. For instance, a material having no inclusions can be dispensed from one nozzle whilst from a different nozzle, a material including inclusions can be dispensed. Since this can lead to materials of different density or viscosity being dispensed, when used with known dispensing units, different masses of one material may be deposited as compared to another. Consequently, in a further exemplary embodiment there is described an improved dispensing unit for the processing machine. Whilst the exemplary embodiment is described as being particularly suitable when used in conjunction with the improved hoppers 120,220 to dispense different materials from nozzles of the same machine, it will be appreciated that the improved dispensing unit may equally be used with known hoppers, for instance, if different masses of the same material are required to be dispensed from nozzles of the same processing machine.

According to exemplary embodiments, an improved dispensing unit 230 comprises a piston unit 240 and a nozzle unit 250. The piston unit 240 co-operates with the nozzle unit 250 to dispense material from the nozzle unit. The piston unit comprises a plurality of pistons 244 and the nozzle unit comprises a co-operating plurality of nozzles 254. The dispensing unit 230 is improved because the dispensing unit is configured so as to dispense a first volume from at least one of the co-operating piston and nozzles and a second volume from at least one of the other co-operating piston and nozzles, wherein the first volume is different to the second. In one alternative exemplary embodiment, the dispensing unit is configured to dispense different volumes by altering the volume of the nozzles 254 (see for example FIG. 4). In another, alternative exemplary embodiment, the dispensing unit is configured to dispense different volumes by altering a stroke length of the piston and nozzles (see for example FIG. 5).

Figure 4:
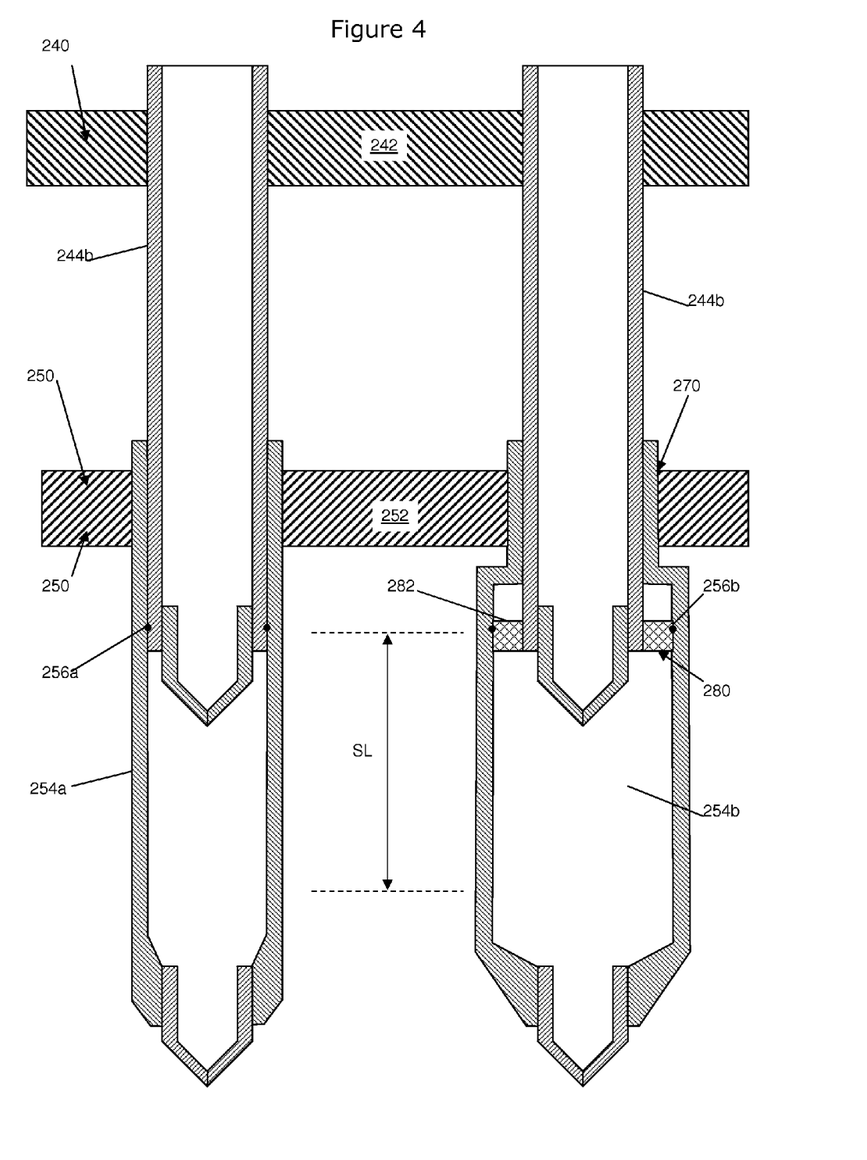
FIG. 4 shows a cross-sectional view of a confectionery processing machine in accordance with an exemplary embodiment.

In the exemplary embodiment shown in FIG. 4, the volume dispensed by one nozzle 254a is different to that dispensed by another nozzle 254b by altering the size of the respective nozzle 254. That is, a piston stroke length (SL) remains constant for all the plurality of co-operating piston and nozzles, but by altering the volume of the respective nozzles 254, different volumes can be dispensed. Here, the plurality of pistons 244 are held fast in a piston plate 242 so that all the pistons move simultaneously and the plurality of nozzles are held fast in a nozzle plate 252. A seal 256 is formed between each piston 244 and nozzle 254. As the piston plate moves toward the nozzle plate, from a maximum to minimum separation, a volume is defined by the difference between the two limits of the travel (e.g. the stroke length) and a cross-sectional area of that stroke length. Thus, because the nozzle 254b has a larger cross-sectional area than the nozzle 254a, a greater volume is dispensed.

Figure 5:
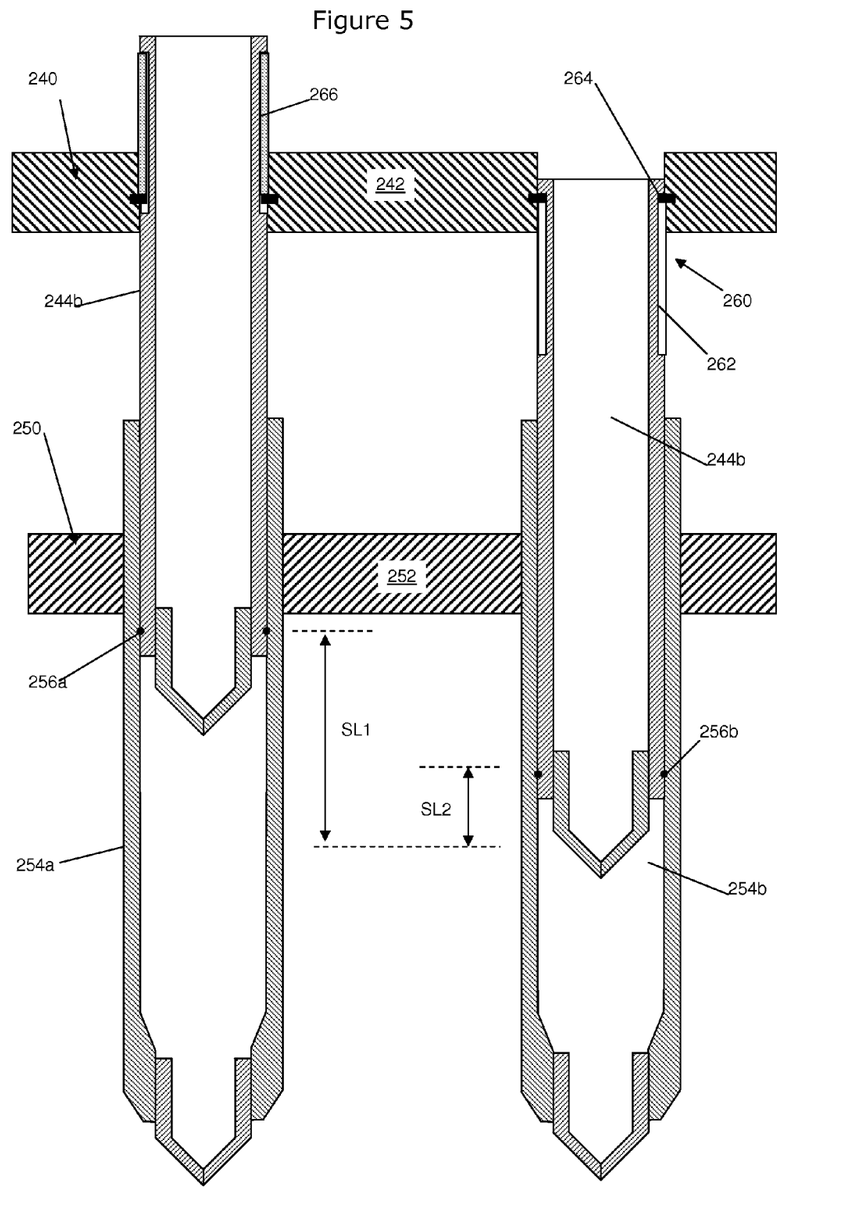
FIG. 5 shows another cross-sectional view of a confectionery processing machine in accordance with an exemplary embodiment.

In the exemplary embodiment shown in FIG. 5, the volume dispensed by nozzle 254a is different to that dispensed by nozzle 254b by altering the stroke length of the respective co-operating piston and nozzle. That is, the volume of each of the plurality of co-operating piston and nozzles remains constant, but the volume dispensed is varied by altering the stroke length (e.g. a difference in the distance travelled by the seals 256a and 256b). As shown in FIG. 5, this may be achieved by mounting the pistons 244 movably within the piston plate 242. Thus, at least one piston is arranged to move separately to another. For instance, one piston may be fixed fast to the piston plate 242 whilst another piston may be fixed to the piston plate 242 in a slip arrangement. Suitably, the slip arrangement is shown in FIG. 5 as a slip means 260 that is arranged to connect the piston 244b to the piston plate 242 so that the piston moves a different distance than the piston plate. For instance, the piston 244b may be connected to the piston plate 242 via a gearing. Thus linear movement of the piston plate relative to the nozzle unit causes a movement of the respective piston 244 according to the gear ratio connecting the two. Alternatively, as shown in FIG. 5, the slip means 260 may be a co-operating channel and protrusion. For instance, as shown, a channel 262 may be formed in the external wall of the piston. The channel has an elongate length in the direction of movement of the piston. For stability, it is preferable if two or more channels are provided or the channel 262 may be educed outer size such as a reduced diameter region. The protrusion is formed on the other of the piston plate or piston, and is shown as a member 264 fixed fast to the piston plate in FIG. 5. However, the protrusion may also be integrally formed. To match the channels, the protrusion may be a plurality of protrusions spaced around an aperture that receives the piston or may be a reduced sized aperture such as reduced diameter. Consequently, the linear extents of the channel provide stops against which the protrusion abuts. Thus, on the down stroke, as the piston plate moves toward the nozzle plate, the piston that is attached fast to the piston plate moves immediately, whereas the piston including the slip means initially will not move as the protrusion 264 does not abut an extent of the channel (e.g. the protrusion moves within and relative to the channel). The piston including the slip means does not begin to move until the protrusion has moved the length of the channel and abuts the lower extent. Thus the stroke length of the piston including the slip means is reduced. On the up stroke, and in reverse, the protrusion moves relative to the channel until it reaches the upper limit. The length of each stroke can be controlled by the length of each respective channel. It will be appreciated that because the pistons move differently to each other, it may be necessary to connect each piston in a flexible way to the hopper. For instance the hopper may be connected to each piston via a shaft that is moveably sealed to each respective piston.

It will be appreciated that the change in dispensing volume between co-operating piston and nozzles of the same processing machine may also be achieved by a combination of altering the nozzle volume and stroke length.

Whilst the processing machine may be configured in a fixed arrangement of dispensing volumes of each of the co-operating piston and nozzles, it is advantageous if the volumes dispensed by each co-operating piston and nozzle is easily adjustable. This is because it allows the processing machine to be adapted to match the required output of the processing plant. It also allows the change over time to be reduced.

Consequently, whilst it is possible to alter the volume of each nozzle by providing the machine with a different sized nozzle and matching sized piston, it is advantageous if, as shown in FIG. 4, each of the plurality of pistons is a constant size and the nozzle plate 252 includes a plurality of substantially identical nozzle attaching locations 270. Here, the attaching locations allow each nozzle 254 to be arranged on the nozzle plate 252 in co-operating arrangement with the pistons 244. Thus, because identical attaching locations 270 are used, each nozzle size is able to be fitted to any position on the nozzle plate. The attaching locations 270 and nozzles 254 include attaching means. The attaching means may be any suitable means such as a screw or bayonet fixing or the alike. It will be appreciated that because the piston size remains constant but the nozzle size may alter, a means 280 to alter the piston size at the seal 256 must also be provided. The means may be to replace the seal 256 with a seal of a different external size. However, In FIG. 4, the means 280 is suitably shown as a replaceable collar 282. Here, a replaceable collar 282 is provided for each nozzle size so as to adapt an end region of the piston to match the nozzle size. The replaceable collar may be attached to the piston by any suitable releasable means such as a screw or bayonet fixing or the alike.

Furthermore, whilst the slip means 260 for each piston may be fixed, it is preferable if the slip means is adjustable. For example, as suitably shown in FIG. 5, inserts 266 may be provided for adjusting the length of each channel.

It will be appreciated that whilst the improved dispensing unit has been described above as having first and second volumes, the co-operating piston and nozzle pairs may be divided in to sets, with each set having a different size. Whilst, two sets may be provided, a plurality of sets may be provided, with each configured to dispense a different volume. Moreover, each set may include one or more co-operating piston and nozzles. The sets may therefore be matched, when used with the improved hopper, to the separate compartments or each cooperating piston and nozzle may be independently configured to dispense a required volume.

Consequently, there is provided an improved dispensing unit or processing machine including the dispensing unit, due to the ability to dispense different volumes form nozzles of the same dispensing unit. Moreover, it is particularly advantageous when the dispensing unit is adjustable as change over time and costs can be reduced and the output can be adapted to match demand.

In a further exemplary embodiment, not shown, of the processing machine, heating means is provided through the processing machine. For instance, the hopper may be heated or the dispensing unit may be heated or both in order to maintain the material being dispensed at the required processing temperature. The heating means is preferably zonal. That is, preferably, the heating for one area is controllable independently of another. The heating zones may be matched to the compartments of the improved hopper.

Thus, when different materials are dispensed from one machine, each material can be maintained at a preferred temperature, whereas without zonal heating a worse case heating would need to be applied. Consequently, water circulation channels and/or electrical heating elements may be formed throughout the machine. In the case of water circulation channels, two or more separate channels may be provided so that each channel provides a zone. Thus different zones can be heated with different fluid sources. In the case of electrical heating elements being used, thermo electric heaters such as peltier elements can be used and controlled independently to achieve zonal heating. Alternatively heating elements woven into fabric or joined with other conductive materials can be wrapped around portions of the machine.

The exemplary processing machines described herein may be used in conjunction with downstream processing equipment such as a vibration station and cooling station. The vibration station vibrates the mould in order to level off the dispensed material, remove bubbles and ensure the material reaches the corner of the moulds etc. The cooling station controls the cooling of the material. Here, when the improved hopper is used, it is again preferable if one or both of the vibration station and cooling station are zonal in order to independently control the vibration/cooling applied to each of the different materials.

For example, the exemplary processing machine may dispense each material into an individual mould. At the vibration station, each individual mould may be clamped separately and vibrated. Alternatively, different vibration may be applied to different zones of one mould for instance by using ultra sonic vibration and applying separate ultrasonic probes to spaced areas of the mould to apply the vibration. Alternatively, rather than zonal vibration a common vibration profile may be used. The vibration profile may be a worst case profile or a profile may be configured so that the mould is vibrated using a single profile but different areas of the mould see different amounts of vibration. Alternatively the mould may be adapted so that different areas have different vibration characteristics.

Furthermore, each individual mould may be processed by a separate cooling station. Alternatively, a single mould may be passed through a cooling station having zonal cooling. For instance, a manifold ejecting cool air over the mould may be divided into multiple outlets, with each outlet arranged to eject air over a specific part of the mould. Here, the temperature of the air of each outlet may be individually controllable.

Although preferred embodiment(s) of the present invention have been shown and described, it will be appreciated by those skilled in the art that changes may be made without departing from the scope of the invention as defined in the claims.

The invention claimed is:

1. A confectionery processing apparatus comprising:
a cooling station providing zonal cooling to cool a mould, wherein the cooling station is arranged to independently control the cooling applied to different zones of the mould by means of a manifold ejecting cooling air over an upper surface of the mould,
wherein the manifold includes multiple outlets, with each outlet arranged to eject cool air over a specific zone of the upper surface of the mould, and
wherein a temperature of the cooling air of each outlet is individually controllable.

2. The confectionery processing apparatus of claim 1, wherein the apparatus includes a confectionery processing machine for dispensing material.

3. The confectionery processing apparatus of claim 2 wherein the confectionery dispensing machine comprises:
a plurality of co-operating piston and nozzles and the hopper is arranged to supply an edible material to the plurality of co-operating piston and nozzles, the dispensing unit being arranged to dispense the edible material from the plurality of co-operating piston and nozzles;
wherein the hopper includes a dividing means that is arranged to divide the hopper into at least two separate compartments, wherein each compartment separately provides edible material to a portion of the plurality of piston and nozzles.

4. The confectionery processing apparatus of claim 2 wherein the confectionery dispensing machine comprises:
a piston unit and a nozzle unit, wherein the piston unit and nozzle unit comprise a plurality of corresponding pistons and nozzles that co-operate to dispense material from each co-operation piston and nozzle;
wherein the piston unit and nozzle unit are configured so that a volume dispensed by at least one of the co-operating piston and nozzles is different to a volume dispensed by at least one of the other co-operating pistons and nozzles.

5. The confectionery processing apparatus of claim 1, comprising a vibration station to vibrate the mould, wherein the vibration station is zonal and arranged to vibrate a portion of the mould differently to at least another portion.

6. The confectionery processing apparatus of claim 1 having a hopper attached to a dispensing unit, the dispensing unit comprising:
a plurality of co-operating piston and nozzles and the hopper is arranged to supply an edible material to the plurality of co-operating piston and nozzles, the dispensing unit being arranged to dispense the edible material from the plurality of co-operating piston and nozzles;
wherein the hopper includes a dividing means that is arranged to divide the hopper into at least two separate compartments, wherein each compartment separately provides edible material to a portion of the plurality of piston and nozzles.

7. The confectionery processing apparatus according to claim 6, wherein the dividing means comprises at least one dividing plate.

8. The confectionery processing apparatus according to claim 7, wherein the at least one dividing plate is fixed fast within the hopper.

9. The confectionery processing apparatus according to claim 8, including a plurality of interchangeable hoppers, wherein each hopper is configured so that the proportion or position of the plurality of piston and nozzles supplied by one chamber in a first hopper is different to the proportion or position of the plurality of piston and nozzles supplied by one chamber in a second hopper.

10. The confectionery processing apparatus according to claim 4, wherein the at least one dividing plate is moveable within the hopper.

11. The confectionery processing apparatus according to claim 10, wherein seals are provided to seal each moveable dividing plate within the hopper.

12. The confectionery processing apparatus according to claim 11, wherein the seals are provided on each moveable dividing plate.

13. The confectionery processing apparatus according to claim 12, wherein the seals have a stiffness, and a combination of the stiffness and gap between the dividing plate and surface being sealed against is such that a force is exerted to maintain the position of the dividing plate.

14. The confectionery processing apparatus according to claim 11, wherein the hopper includes at least two channel sets, with each channel set being adapted to receive a dividing plate.

15. The confectionery processing apparatus according to claim 6,
wherein the plurality of corresponding pistons and nozzles that co-operate to dispense material from each co-operation piston and nozzle form a piston and nozzle unit;
wherein the piston unit and nozzle unit are configured so that a volume dispensed by at least one of the co-operating piston and nozzles is different to a volume dispensed by at least one of the other co-operating pistons and nozzles.

16. The dispensing unit of claim 15, wherein the nozzle unit is configured to dispense a different volume by at least one of the plurality of nozzles having a different volume to at least one other of the plurality of nozzles.

17. The dispensing unit of claim 15, wherein the piston unit is configured to dispense a different volume by including means to move at least of the plurality of pistons a different amount than at least one of the other pistons.

18. The dispensing unit of claim 16, wherein each of the plurality of pistons is a common size and the nozzle unit includes a plurality of common attachment means for attaching each nozzle, the piston unit further comprising means to adjustably change the size of an end region of each piston.

19. The dispensing unit of claim 18, wherein the means to adjustably change the size of the end of each piston comprises an attachable collar.

20. The dispensing unit of claim 17, wherein the piston unit includes a piston plate, wherein the plurality of pistons are attached to the piston plate and at least one of the plurality of pistons is attached in a movable manner.

21. The dispensing unit of claim 20, wherein the at least one piston is attached in a slip arrangement using slip means.

22. The dispensing unit of claim 21, wherein the slip means comprises a channel and co-operating protrusion.

23. The dispensing unit of claim 22, wherein the slip means is adjustable using inserts to alter the length of the channel.

* * * * *